United States Patent
Maeda et al.

(10) Patent No.: US 10,400,103 B2
(45) Date of Patent: Sep. 3, 2019

(54) THERMOPLASTIC RESIN COMPOSITION, MOLDED PRODUCT, AND METHOD OF PRODUCING MOLDED PRODUCT

(71) Applicant: ASAHI KASEI KABUSHIKI KAISHA, Chiyoda-ku, Tokyo (JP)

(72) Inventors: Chihiro Maeda, Tokyo (JP); Yuo Umei, Tokyo (JP); Mihoko Yamamoto, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 15/368,677

(22) Filed: Dec. 5, 2016

(65) Prior Publication Data

US 2017/0166746 A1 Jun. 15, 2017

(30) Foreign Application Priority Data

Dec. 9, 2015 (JP) .................. 2015-240558

(51) Int. Cl.
| | |
|---|---|
| C08L 77/06 | (2006.01) |
| B29C 45/00 | (2006.01) |
| B29C 45/27 | (2006.01) |
| B29K 71/00 | (2006.01) |
| B29K 77/00 | (2006.01) |
| B29K 105/00 | (2006.01) |
| B29L 31/30 | (2006.01) |
| B29L 31/34 | (2006.01) |

(52) U.S. Cl.
CPC .......... *C08L 77/06* (2013.01); *B29C 45/0001* (2013.01); *B29C 45/0081* (2013.01); *B29C 45/2708* (2013.01); *B29K 2071/12* (2013.01); *B29K 2077/00* (2013.01); *B29K 2105/0088* (2013.01); *B29K 2105/251* (2013.01); *B29L 2031/30* (2013.01); *B29L 2031/34* (2013.01);

*C08L 2205/03* (2013.01); *C08L 2205/06* (2013.01); *C08L 2205/08* (2013.01)

(58) Field of Classification Search
None
See application file for complete search history.

(56) References Cited

U.S. PATENT DOCUMENTS 7,935,275 B2   5/2011  Miyoshi et al.

FOREIGN PATENT DOCUMENTS

| JP | 2005342969 A | 12/2005 |
| JP | 3961004 B2 | 8/2007 |
| JP | 2009197196 A | 9/2009 |
| JP | 2009298843 A | 12/2009 |
| JP | 2015113374 A | 6/2015 |

OTHER PUBLICATIONS

JP 2009-298843 A (machine translation).*

* cited by examiner

*Primary Examiner* — Ana L. Woodward
(74) *Attorney, Agent, or Firm* — Kenja IP Law PC

(57) ABSTRACT

The thermoplastic resin composition contains (A) a polyamide, (B) a polyphenylene ether, and (C) a compatibilizer. When the thermoplastic resin composition is molded into a specimen, a continuous phase containing the polyamide (A) and a dispersed phase containing the polyphenylene ether (B) are formed in the specimen, and E-20 represents a mean ellipticity of the dispersed phase in region I extending from a surface of the hinge portion to a depth of 20 μm in the thickness direction, and E-mid represents a mean ellipticity of the dispersed phase in region II extending from a distance, measured along the thickness direction from the surface, equal to 48% of the thickness to a distance, measured along the thickness direction from the surface, equal to 52% of the thickness, the following formula (1) is satisfied:

$4.0 \leq (E\text{-}20)/(E\text{-mid})$   (1).

9 Claims, 1 Drawing Sheet

THERMOPLASTIC RESIN COMPOSITION, MOLDED PRODUCT, AND METHOD OF PRODUCING MOLDED PRODUCT

TECHNICAL FIELD

The disclosure relates to a thermoplastic resin composition, a molded product, and a method of producing a molded product.

BACKGROUND

Molded products with a hinge structure are often used as resin molded products used for electrical and electric parts, automotive parts, and the like. With the increasing utilization of electronics in automobiles, electrical components in automobiles are increasing. In particular, as engine rooms are denser and a reduction in the size of electrical components is strongly requested, molded products with a hinge structure used in these components, such as relay blocks, connectors, and the like, have become more sophisticated and complicated in structure. Accordingly, there is demand for components with good hinge characteristics such that they will not break when bent repeatedly.

Conventionally, polyamide is known as a resin that can produce molded products with good hinge characteristics. However, since polyamide alone is not sufficient in terms of heat resistance, flame retardance, dimensional stability, mechanical strength, and so on, techniques have been examined for alloying polyamide with other resins to provide well-balanced characteristics. Representative alloy materials include polyamide/polyphenylene ether compositions. Polyphenylene ether is an amorphous resin and, in general, is not compatibilized with polyamide which is a crystalline resin. However, studies have been made of techniques for allowing polyphenylene ether to be compatibilized with polyamide by dispersing polyphenylene ether in polyamide using a compatibilizing agent.

To improve hinge characteristics in an alloy material of polyamide and polyphenylene ether, some methods have been proposed to increase the interface strength between polyamide and polyphenylene ether by increasing the molecular weight of polyamide or the amount of compatibilizer. Exemplary methods include a method to use a mixture of polyamide 6,6 and polyamide 6 as a polyamide with low viscosity (see, for example, PTL 1) and a method to increase moisture percentage (see, for example, PTL 2).

CITATION LIST

Patent Literature

PTL 1: JP3961004B
PTL 2: JP2009298843A

SUMMARY

As automotive parts are increasing in size, however, molded products are becoming more complicated in shape and still better hinge characteristics are requested.

It could thus be helpful to provide a thermoplastic resin composition that can provide a molded product excellent in mechanical strength, hinge characteristics, and heat resistance, and exhibiting good appearance.

We intensely investigated how to resolve the above issues, and as a result discovered that a molded product excellent in mechanical strength, hinge characteristics, and heat resistance, and exhibiting good appearance can be provided by adjusting the mean ellipticity of a dispersed phase in a surface layer and in an internal portion of a molded product produced from a thermoplastic resin composition within particular ranges. The present disclosure was completed based on the discovery.

The primary features of the disclosure are as follows.

[1] A thermoplastic resin composition comprising (A) a polyamide, (B) a polyphenylene ether, and (C) a compatibilizer, wherein when the thermoplastic resin composition is molded into a specimen having two structural parts and a hinge portion having a width of 3 mm to 5 mm, a length of 5 mm to 25 mm, and a thickness of 0.3 mm to 0.7 mm for connecting the structural parts, a continuous phase containing the polyamide (A) and a dispersed phase containing the polyphenylene ether (B) are formed in the specimen, and provided that in a cross section of the specimen in a plane along the width and thickness directions passing through a midpoint in the length direction of the hinge portion, E-20 represents a mean ellipticity of the dispersed phase in region I extending from a surface of the hinge portion to a depth of 20 μm in the thickness direction, and E-mid represents a mean ellipticity of the dispersed phase in region II extending from a distance, measured along the thickness direction from the surface, equal to 48% of the thickness to a distance, measured along the thickness direction from the surface, equal to 52% of the thickness, the following formula (1) is satisfied:

$$4.0 \leq (E\text{-}20)/(E\text{-mid}) \tag{1}$$

[2] The thermoplastic resin composition according to [1], wherein provided that S-20 represents an area fraction of the dispersed phase in the region I and S-mid represents an area fraction of the dispersed phase in the region II, the following formula (2) is satisfied:

$$1.10 \leq (S\text{-}20)/(S\text{-mid}) \tag{2}$$

[3] The thermoplastic resin composition according to [1] or [2], wherein the thermoplastic resin composition comprises 40 to 90 parts by mass of the polyamide (A) and 60 to 10 parts by mass of the polyphenylene ether (B), per 100 parts by mass in total of the polyamide (A) and the polyphenylene ether (B).

[4] The thermoplastic resin composition according to any of [1] to [3], wherein the compatibilizer (C) is at least one selected from the group consisting of maleic anhydride, maleic acid, citric acid, and fumaric acid, and the thermoplastic resin composition comprises 0.03 to 10.0 parts by mass of the compatibilizer (C) per 100 parts by mass in total of the polyamide (A) and the polyphenylene ether (B).

[5] The thermoplastic resin composition according to any of [1] to [4], further comprising (D) an impact modifier.

[6] A molded product comprising the thermoplastic resin composition as recited in any of [1] to [5].

[7] The molded product according to [6], wherein the molded product is an automotive part.

[8] The molded product according to [7], wherein the molded product is a relay block.

[9] A method of producing a molded product, comprising molding the thermoplastic resin composition as recited in any of [1] to [5] with a mold having a gate with a gate thickness of 1.0 mm or less, at a molding temperature of 270° C. to 290° C., a mold temperature of 30° C. to 60° C., and an injection rate of 45 cm³/sec or higher.

[10] The method of producing a molded product according to [9], wherein the thermoplastic resin composition is in the form of pellets with a moisture percentage of 150 mass ppm to 500 mass ppm.

According to the present disclosure, it becomes possible to provide a thermoplastic resin composition that can provide a molded product excellent in mechanical strength, hinge characteristics, and heat resistance, and exhibiting good appearance. As a consequence, performance requirements for automotive parts with sophisticated and complicated structures can be satisfied.

DETAILED DESCRIPTION

Figure 1A:
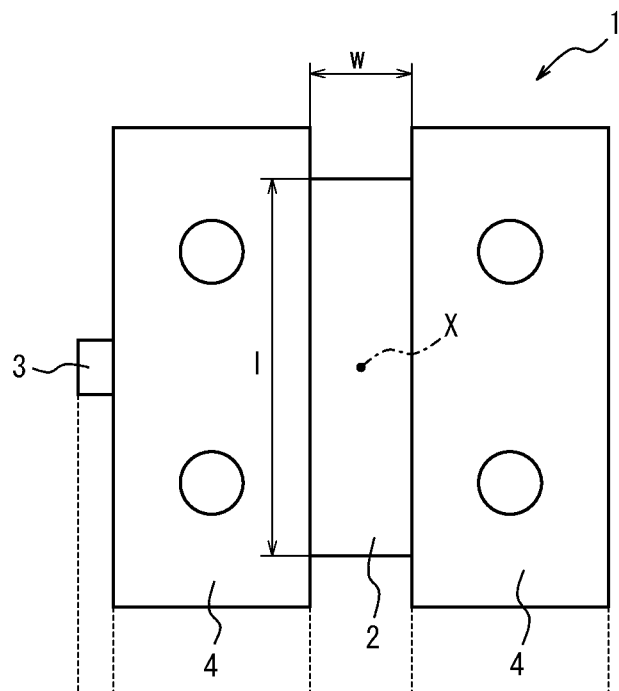
FIG. 1A is a schematic diagram (a plane view) of a specimen for evaluating hinge characteristics used for evaluation of hinge characteristics.

The following provides details of an embodiment for applying this disclosure (hereinafter referred to as "the present embodiment"). The present embodiment is only representative of the disclosure. Thus, the disclosure should not be limited to the present embodiment, and various other modifications can be made without departing from the spirit of the disclosure.

[Thermoplastic Resin Composition]

The thermoplastic resin composition according to the disclosure comprises (A) a polyamide, (B) a polyphenylene ether, and (C) a compatibilizer. Optionally, the thermoplastic resin composition may include, for example, an impact modifier, an oil, a transition metal, a halogen, an organic stabilizer, a styrene-based thermoplastic resin, a stabilizer, a flame retardant, an anti-dripping agent, and an additional component.

When the thermoplastic resin composition is molded into a specimen comprising two structural parts and a hinge portion having a width of 3 mm to 5 mm, a length of 5 mm to 25 mm, and a thickness of 0.3 mm to 0.7 mm for connecting the structural parts, a continuous phase containing the polyamide (A) and a dispersed phase containing the polyphenylene ether (B) are formed in the specimen, and provided that in a cross section of the specimen in a plane along the width and thickness directions passing through a midpoint in the length direction of the hinge portion, E-20 represents a mean ellipticity of the dispersed phase in region I extending from a surface of the hinge portion to a depth of 20 μm in the thickness direction, and E-mid represents a mean ellipticity of the dispersed phase in region II extending from a distance, measured along the thickness direction from the surface, equal to 48% of the thickness to a distance, measured along the thickness direction from the surface, equal to 52% of the thickness, the following formula (1) is satisfied:

$$4.0 \leq (E\text{-}20)/(E\text{-mid}) \quad (1)$$

Each component in the thermoplastic resin composition according to the disclosure will be explained below.

((A) Polyamide)

In the thermoplastic resin composition according to the present embodiment, any polyamide may be used as the polyamide as long as an amide bond {—NH—C(=O)—} is contained in the polymer repeating unit structure.

The polyamide refers to a polymer obtained by polycondensation of an aminocarboxylic acid, ring-opening polymerization of lactams, polycondensation of a diamine and a dicarboxylic acid, or the like.

Examples of the aminocarboxylic acid include, but are not limited to, ε-aminocaproic acid, 7-aminoheptanoic acid, 8-aminooctanoic acid, 9-aminononan acid, 11-aminoundecanoic acid, 12-aminododecanoic acid, and 13-aminotridecane acid.

Examples of the lactams include, but are not limited to, butyrolactam, pivalolactam, ε-caprolactam, caprylolactam, enantholactam, undecanolactam, and ω-laurolactam. Among these, preferred are ε-caprolactam, enantholactam, and ω-laurolactam.

Examples of the diamine include aliphatic, alicyclic, and aromatic diamines, specific examples of which include ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, 2-methyl-1,8-octamethylenediamine, 2,2,4-trimethylhexamethylenediamine, 2,4,4-trimethylhexamethylenediamine, 5-methylnanomethylenediamine, 1,3-bis-aminomethylcyclohexane, 1,4-bis-aminomethylcyclohexane, m-phenylenediamine, p-phenylenediamine, m-xylylenediamine, p-xylylenediamine, 2-methylpentamethylenediamine (also denoted as 2-methyl-1,5-diaminopentane), 2,4-dimethyloctamethylenediamine, meta-xylylenediamine, para-xylylenediamine, 1-amino-3-aminomethyl-3,5,5-trimethylcyclohexane, 3,8-bis(aminomethyl)tricyclodecane, bis(3-methyl-4-aminocyclohexyl)methane, 2,2-bis(4-aminocyclohexyl)propane, bis(aminopropyl)piperazine, and aminoethylpiperazine.

Examples of the dicarboxylic acid include aliphatic, alicyclic, and aromatic dicarboxylic acids, specific examples of which include adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalene dicarboxylic acid, dimer acid, 2-methylterephthalic acid, 5-methylisophthalic acid, 5-sodiumsulfoisophthalic acid, hexahydroterephthalic acid, hexahydroisophthalic acid, diglycolic acid, 1,4-cyclohexanedicarboxylic acid, 1,3-cyclopentanedicarboxylic acid.

The aminocarboxylic acid, the lactams, the diamine, and the dicarboxylic acid may be used alone or in a combination of two or more. Additionally, as the aminocarboxylic acid, the lactams, the diamine, and the dicarboxylic acid, those polymerized to an oligomer of low molecular weight in a polymerization reactor and then increased in molecular weight in an extruder or the like may be preferably used.

Examples of the polyamide include polyamide 6, polyamide 6,6, polyamide 4,6, polyamide 11, polyamide 12, polyamide 6,10, polyamide 6,12, polyamide 6/6,6, polyamide 6/6,12, polyamide 6,MXD (m-xylylenediamine), polyamide 6,T, polyamide 6,I, polyamide 6/6,T, polyamide 6/6,I, polyamide 6,6/6,T, polyamide 6,6/6,I, polyamide 6/6, T/6,I, polyamide 6,6/6,T/6,I, polyamide 6/12/6,T, polyamide 6,6/12/6,T, polyamide 6/12/6,I, polyamide 6,6/12/6,I, and polyamide 9,T. Among these, preferred are polyamide 6, polyamide 6,6, polyamide 6/6,6, and a mixture thereof, and more preferred are polyamide 6,6 and a mixture of polyamide 6,6 and polyamide 6.

The above-described polyamides may be used alone or in a combination of two or more.

When a mixture of polyamide 6,6 and polyamide 6 is used as the polyamide, the content of polyamide 6,6 is preferably 70 mass % to 99 mass %, and more preferably 80 mass % to 90 mass %, per 100 mass % in total of the mixture of polyamide 6,6 and polyamide 6.

The polyamide may contain a well-known additive or the like that can be added to the polyamide in an amount of less than 10 parts by mass per 100 parts by mass of the polyamide.

The viscosity number of the polyamide is preferably 100 mL/g to 130 mL/g, and more preferably 110 mL/g to 128 mL/g, as measured in 96% sulfuric acid in conformance with ISO 307:1994. When the viscosity number is within this range, it is possible to increase the fluidity and mechanical strength of the thermoplastic resin composition.

The polyamide may be a mixture of multiple polyamides with different viscosity numbers. When polyamides with different viscosity numbers are used, it is desirable that the polyamide mixture has a viscosity number within the aforementioned range. The viscosity number of the polyamide mixture may be determined by measuring the viscosity number of the polyamide mixture mixed in a desired mixing ratio.

The polyamide has a terminal group associated with a reaction with polyphenylene ether. The polyamide has an amino group or a carboxyl group as a terminal group. In general, a higher carboxyl group concentration leads to lower impact resistance and higher fluidity, and a higher amino group concentration leads to higher impact resistance and lower fluidity.

In the terminal group of the polyamide, the concentration ratio of amino group/carboxyl group is preferably 9/1 to 1/9, more preferably 6/4 to 1/9, and even more preferably 5/5 to 1/9.

The concentration of an amino group as the terminal group of the polyamide is preferably 50 µmol/g or lower, more preferably 40 µmol/g or lower, and even more preferably 35 µmol/g or lower, and preferably 10 µmol/g or higher. When the concentration of the terminal amino group is 50 µmol/g or lower, it is possible to prevent a significant decrease in the fluidity of the thermoplastic resin composition in the mold, an increase in deformation of the molded product after heating, and the occurrence of a wrinkle pattern (flow lines) in the molded product.

The terminal group of the polyamide may be adjusted with a well-known method as apparent for a person skilled in the art, for example, by adding one or more members selected from the group consisting of diamine, monoamine, dicarboxylic acid, and monocarboxylic acid at the time of polymerization of the polyamide.

((B) Polyphenylene Ether)

In the thermoplastic resin composition according to the present embodiment, examples of the polyphenylene ether include a homopolymer or a copolymer having a repeating unit (a repeating unit derived from phenylene ether) represented by formula (1) and/or formula (2) below.

The above-described polyphenylene ethers may be used alone or in a combination of two or more.

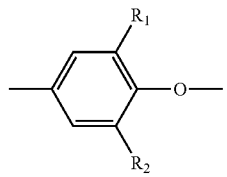

(1)

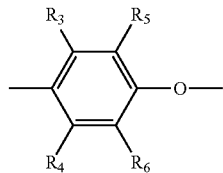

(2)

Where $R_1$, $R_2$, $R_3$, $R_4$, $R_5$, and $R_6$ each independently represent a hydrogen atom, a $C_1$-$C_4$ alkyl group, a $C_6$-$C_9$ aryl group, or a halogen atom, with the proviso that $R_3$ and $R_4$ do not represent hydrogen atoms at the same time.

Examples of the polyphenylene ether include poly(2,6-dimethyl-1,4-phenylene ether); poly(2-methyl-6-ethyl-1,4-phenylene ether); poly(2-methyl-6-phenyl-1,4-phenylene ether); poly(2,6-dichloro-1,4-phenylene ether); copolymers of 2,6-dimethylphenol and other phenols (for example, a copolymer with 2,3,6-trimethylphenol or a copolymer with 2-methyl-6-butylphenol, as described in JPS5217880B). Among these, preferred are poly(2,6-dimethyl-1,4-phenylene ether) and a copolymer of 2,6-dimethylphenol and 2,3,6-trimethylphenol, or a mixture thereof.

The polyphenylene ether may be produced with well-known methods, such as those described in U.S. Pat. Nos. 3,306,874A, 3,306,875A, 3,257,357A, 3,257,358A, JPS5051197A, JPS5217880B, and JPS63152628B.

The polyphenylene ether has a reduced viscosity (as measured by a Ubbelohde-type viscometer in a 0.5 g/dL chloroform solution at 30° C.) in the range of preferably 0.40 dL/g to 0.55 dL/g, more preferably 0.40 dL/g to 0.45 dL/g, and even more preferably 0.41 dL/g to 0.45 dL/g.

The polyphenylene ether may be a mixture of two or more polyphenylene ethers different in reduced viscosity, for example, a mixture of a polyphenylene ether having a reduced viscosity of 0.45 dL/g or less and a polyphenylene ether having a reduced viscosity of 0.50 dL/g or more, a mixture of a low-molecular-weight polyphenylene ether having a reduced viscosity of 0.40 dL/g or less and a polyphenylene ether having a reduced viscosity of 0.50 dL/g or more, or the like.

In the polyphenylene ether, any solvent used in the polymerization may remain in an amount of less than 5 mass % based on the polyphenylene ether (100 mass %).

It is difficult to completely remove in a drying process after the polymerization such solvent that is used in the polymerization and remains in the polyphenylene ether. Examples of the solvent include solvents remaining in the polyphenylene ether (100 mass %) in amounts of several hundred mass ppm to several mass percent, for example, isomers of toluene and xylene, ethylbenzene, $C_1$-$C_5$ alcohols, chloroform, dichloromethane, chlorobenzene, and dichlorobenzene.

The polyphenylene ether may be a modified polyphenylene ether modified in whole or part. Examples of the modified polyphenylene ether include polyphenylene ethers modified with at least one modifying compound having in the molecular structure at least one carbon-carbon double or triple bond and at least one carboxylic acid group, acid anhydride group, amino group, hydroxyl group, or glycidyl group.

The above-described modifying compounds may be used alone or in a combination of two or more.

Modifying compounds having in the molecular structure a carbon-carbon double bond and a carboxylic acid group or an acid anhydride group include maleic acid, fumaric acid, chloromaleic acid, cis-4-cyclohexene-1,2-dicarboxylic acid, and acid anhydrides thereof. Among these, preferred are fumaric acid, maleic acid, and maleic anhydride, and particularly preferred are fumaric acid and maleic anhydride. Additionally, one or both of two carboxyl groups of each unsaturated dicarboxylic acid may be an ester.

Modifying compounds having in the molecular structure a carbon-carbon double bond and a glycidyl group include allyl glycidyl ether, glycidyl acrylate, glycidyl methacrylate, and epoxidized natural fats and oils. Among these, preferred are glycidyl acrylate and glycidyl methacrylate.

Modifying compounds having in the molecular structure a carbon-carbon double bond and a hydroxyl group include unsaturated alcohols such as allyl alcohol, 4-penten-1-ol, and 1,4-pentadiene-3-ol, represented by general formulas of $C_nH_{2n}$—3OH (where n is a positive integer), $C_nH_{2n}$—5OH (where n is a positive integer), $C_nH_2$—7OH (where n is a positive integer), and the like.

Methods of producing the modified polyphenylene ether include, for example, in the presence or absence of a radical initiator, (1) reacting a polyphenylene ether with a modifying compound at or above 100° C. and below the glass transition temperature of the polyphenylene ether without melting the polyphenylene ether, (2) melting and kneading a polyphenylene ether with a modifying compound at a temperature from the glass transition temperature of the polyphenylene ether to 360° C. to react with the modifying compound, and (3) reacting a polyphenylene ether with a modifying compound in a solution at a temperature below the glass transition temperature of the polyphenylene ether; among these, preferred are the method (1) or (2).

In production of the modified polyphenylene ether, the addition amount of the modifying compound is preferably 0.1 to 10 parts by mass, and more preferably 0.3 to 5 parts by mass, per 100 parts by mass of the polyphenylene ether.

If a radical initiator is used in production of the modified polyphenylene ether, the addition amount of the radical initiator is preferably 0.001 to 1 part by mass per 100 parts by mass of the polyphenylene ether.

The at least one modifying compound is added to the modified polyphenylene ether in a ratio of preferably 0.01 to 5 parts by mass, more preferably 0.1 to 3 parts by mass, per 100 parts by mass of the modified polyphenylene ether. In the modified polyphenylene ether, an unreacted modifying compound and/or a polymer of a modifying compound may remain in an amount of less than 1 part by mass.

In the thermoplastic resin composition according to the present embodiment, the content of the polyamide is preferably 40 to 90 parts by mass, more preferably 50 to 85 parts by mass, and even more preferably 60 to 80 parts by mass, and the content of the polyphenylene ether is preferably 60 to 10 parts by mass, more preferably 50 to 15 parts by mass, and even more preferably 40 to 20 parts by mass, per 100 parts by mass in total of the polyamide and the polyphenylene ether.

When the contents of the polyamide and the polyphenylene ether are within this range, the molded product has particularly superior mechanical strength and hinge characteristics.

The polyphenylene ether may contain a well-known additive or the like that can added to the polyphenylene ether in an amount of less than 10 parts by mass per 100 parts by mass of the polyphenylene ether.

((C) Compatibilizer)

Preferably, the compatibilizer contained in the thermoplastic resin composition according to the present embodiment is at least one compound having in the molecular structure at least one carbon-carbon double or triple bond and at least one carboxyl group, acid anhydride group, amino group, hydroxyl group, or glycidyl group, as set forth in WO01/81473A. Among these, preferred is at least one selected from the group consisting of maleic anhydride, maleic acid, fumaric acid, citric acid, a derivative thereof, and a mixture thereof, more preferred is at least one selected from the group consisting of maleic anhydride, maleic acid, fumaric acid, and citric acid, and particularly preferred is maleic acid and/or an anhydride thereof from the perspective of improving additional characteristics such as weld strength of the thermoplastic resin composition.

The above-described compatibilizers may be used alone or in a combination of two or more.

In the thermoplastic resin composition according to the present embodiment, when maleic acid and/or an anhydride is selected as the compatibilizer, the content of the compatibilizer is preferably 0.03 to 0.3 parts by mass, more preferably 0.07 to 0.3 parts by mass, and even more preferably 0.1 to 0.3 parts by mass, per 100 parts by mass of the polyphenylene ether. When the content of the compatibilizer is within this range, the molded product may have even better hinge characteristics, mechanical strength, fluidity, and appearance.

From the perspective of facilitating the diffusion of the polyphenylene ether in the polyamide, and further facilitating the formation of a continuous phase by the polyamide and a dispersed phase by the polyphenylene ether in the molded product, the content of the compatibilizer is preferably 0.03 to 10.0 parts by mass, and more preferably 0.05 to 5.0 parts by mass, per 100 parts by mass in total of the polyamide and the polyphenylene ether.

When one or more members selected from the group consisting of fumaric acid, citric acid, and a derivative thereof are selected as the compatibilizer, the content of the compatibilizers in the thermoplastic resin composition according to the present embodiment is preferably 0.5 to 4.0 parts by mass, more preferably 1.0 to 3.0 parts by mass, and even more preferably 1.5 to 2.5 parts by mass, per 100 parts by mass in total of the polyamide and the polyphenylene ether. When the content of the compatibilizer is within this range, the molded product may have even better hinge characteristics, mechanical strength, fluidity, and appearance.

((D) Impact Modifier)

The thermoplastic resin composition according to the present embodiment may further comprise an impact modifier to provide even higher impact resistance.

Examples of the impact modifier include a block copolymer consisting of at least one polymer block composed mainly of an aromatic vinyl compound and at least one polymer block composed mainly of a conjugated diene compound, a hydrogenated product thereof, and an ethylene-α-olefin copolymer.

As used herein, "composed mainly of" indicates that the content of a unit derived from the main compound in a polymer block is 50 mass % or more, preferably 70 mass % or more, more preferably 80 mass % or more, even more preferably 90 mass % or more. For example, any block copolymer is considered as being composed mainly of an aromatic vinyl compound as long as at least 50 mass % of the polymer block is formed by the aromatic vinyl compound, if it contains a small amount of a monomer unit derived from a conjugated diene compound or other compound. This also applies to a polymer block composed mainly of a conjugated diene compound.

Examples of the aromatic vinyl compound include styrene, α-methyl styrene, and vinyl toluene; among these, preferred is styrene.

Examples of the conjugated diene compound include butadiene, isoprene, piperylene, 1,3-pentadiene, and a combination thereof; among these, preferred are butadiene, isoprene, and a combination thereof.

As to the microstructure of the polymer block composed mainly of a conjugated diene compound (bonding forms of the conjugated diene compound), a 1,2-vinyl content or the total of a 1,2-vinyl content and a 3,4-vinyl content is preferably 5% to 80%, more preferably 10% to 50%, and most preferably 15% to 40%.

Normally, a conjugated diene compound includes bonding forms of 1,2-vinyl bond, 3,4-vinyl bond, and 1,4-vinyl bond. A vinyl bond content refers to the proportion of a bonding form of the conjugated diene compound at the time of polymerization. For example, a 1,2-vinyl bond content refers to the proportion of 1,2-vinyl bond among the three bonding forms. The 1,2-vinyl bond content, 3,4-vinyl bond content, and 1,4-vinyl bond content can be measured with an infrared spectrophotometer, a nuclear magnetic resonance device, or the like, and calculated in conformity with the method described in *Analytical Chemistry,* Volume 21, No. 8, August 1949.

The block copolymer is preferably a block copolymer in which a polymer block [A], which is composed mainly of an aromatic vinyl compound, and a polymer block [B], which is composed mainly of a conjugated diene compound, are bonded together in the form of A-B, A-B-A, or A-B-A-B, or may be a mixture thereof. Among these, preferred are A-B-A and A-B-A-B or a mixture thereof, and most preferred is A-B-A.

The impact modifier may be a hydrogenated block copolymer. A hydrogenated block copolymer refers to a block copolymer that is hydrogenated, in a hydrogenation ratio from more than 0% to 100%, by the addition of hydrogen to aliphatic double bonds in the block copolymer consisting of the polymer block composed mainly of an aromatic vinyl compound and the polymer block composed mainly of a conjugated diene compound. The hydrogenation ratio of the block copolymer is preferably 50% or more, more preferably 80% or more, and most preferably 95% or more.

The block copolymer preferably has a number-average molecular weight of 150,000 or more. For a hydrogenated block copolymer, the number-average molecular weight is the number-average molecular weight of the hydrogenated block copolymer after being hydrogenated.

As used herein, "number-average molecular weight" refers to a number-average molecular weight that is measured in terms of standard polystyrene with an ultraviolet spectrometer detector using a gel permeation chromatography measuring device. At this point, if any low-molecular-weight components resulting from deactivation of a catalyst during polymerization are detected, such components are excluded from the calculation of molecular weight. Normally, the molecular weight distribution (mass-average molecular weight/number-average molecular weight) is in the range of 1.0 to 1.1.

Each polymer block composed mainly of an aromatic vinyl compound contained in the block copolymer has, on average, a number-average molecular weight of 30,000 or more. When the number-average molecular weight is 30,000 or more on average, the aromatic vinyl compound block in the block copolymer is compatibilized with the polyphenylene ether more easily.

The number-average molecular weight of a polymer block composed mainly of an aromatic vinyl compound can be calculated from the equation below using the number-average molecular weight of the block copolymer as described above:

$$Mn(a)=\{Mn \times a/(a+b)\}/N$$

Where Mn(a) is the number-average molecular weight of a polymer block composed mainly of an aromatic vinyl compound, Mn is the number-average molecular weight of the block copolymer, a is the total content (in mass %) of polymer blocks composed mainly of an aromatic vinyl compound in the block copolymer, b is the total content (in mass %) of polymer blocks composed mainly of a conjugated diene compound in the block copolymer, and N is the number of polymer blocks composed mainly of an aromatic vinyl compound in the block copolymer.

Without impairing the effect of the disclosure, the block copolymer used as the impact modifier may be a mixture of two or more of, for example, a block copolymer different in bonding form, a block copolymer different in the composition of polymer blocks composed mainly of an aromatic vinyl compound, a polymer block different in the composition of polymer blocks composed mainly of a conjugated diene compound, a polymer block different in 1,2-bond vinyl content, 1,2-bond vinyl content and/or 3,4-bond vinyl content, a polymer block different in the content of an aromatic vinyl compound, and a polymer block different in the hydrogenation ratio.

These block copolymers used in the disclosure may be modified block copolymers modified in whole or part.

The "modified block copolymer" refers to at least one block copolymer that is modified with at least one modifying compound having in the molecular structure at least one carbon-carbon double or triple bond and at least one carboxylic acid group, acid anhydride group, amino group, hydroxyl group, or glycidyl group.

In this case, examples of the at least one modifying compound having in the molecular structure at least one carbon-carbon double or triple bond and at least one carboxylic acid group, acid anhydride group, amino group, hydroxyl group, or glycidyl group are the same as those described above for the modified polyphenylene ether.

Methods of producing the modified block copolymer include, for example, in the presence or absence of a radical initiator, (1) melting and kneading a block copolymer with a modifying compound at a temperature from the softening point of the block copolymer to 250° C. to react with the modifying compound, (2) reacting a block copolymer with a modifying compound in a solution at or below the softening point of the block copolymer, and (3) reacting a block copolymer with a modifying compound at or below the softening point of the block copolymer without melting the block copolymer or the modifying compound; among these, preferred is the method (1), and most preferred is the method (1) when performed in the presence of a radical initiator.

In the thermoplastic resin composition according to the present embodiment, the content of the impact modifier is preferably 5 to 70 parts by mass, more preferably 10 to 30 parts by mass, and even more preferably 10 to 20 parts by mass, per 100 parts by mass of the polyphenylene ether.

In addition, the content of the impact modifier is preferably 0.1 to 40 parts by mass, and more preferably 0.5 to 20 parts by mass, per 100 parts by mass in total of the polyamide and the polyphenylene ether.

(Oil)

The thermoplastic resin composition according to the present embodiment may further comprise an oil.

The oils refer to inorganic or organic fats and oils in liquid form at 30° C., including, for example, synthetic oils, mineral oils, animal oils, and vegetable oils. Among these, preferred are vegetable oils such as soybean oil and linseed oil; and heat transfer oils such as naphthenic oil, paraffinic oil, aromatic oil, and benzyl toluene, more preferred are naphthenic oils, paraffinic oils, and aromatic oils, even more preferred are naphthenic oils and paraffinic oils, and most preferred are paraffinic oils. The above-described oils may be used alone or in a combination of two or more.

Generally, oils are mixtures of an aromatic ring-containing compound, a naphthene ring-containing compound, and a paraffinic compound, and are classified into the following categories: "paraffinic oil" containing carbon atoms in the paraffin chain accounting for 50% or more of the total carbon atoms, "naphthenic oil" containing naphthene ring carbon atoms accounting for 30% to 45% of the total carbon atoms, and "aromatic oil" containing aromatic carbon atoms accounting for more than 30% of the total carbon atoms.

The number-average molecular weight of the paraffinic oil is preferably 100 to 10,000, more preferably 100 to 2,000, and even more preferably 200 to 1,500.

The paraffinic oil preferably contains 50 mass % or more of a paraffinic compound, and more preferably contains 50 mass % to 90 mass % of a paraffinic compound, 10 mass % to 40 mass % of a naphthene ring-containing compound, and 5 mass % or less of an aromatic ring-containing compound. The number-average molecular weight of the paraffinic oil is preferably 100 to 2,000, and more preferably 200 to 1,500.

One of the commercially available paraffinic oils is, for example, Diana Process Oil PW-380 (manufactured by Idemitsu Petrochemical Co., Ltd., kinematic viscosity: 381.6 cst (at 40° C.), mean molecular weight: 746, naphthene ring carbon atoms: 27%, paraffin ring carbon atoms: 73%).

Without limitation, methods of adding the oil include: adding the oil in liquid form at the time of melting and kneading the polyamide with the polyphenylene ether; and mixing, in advance, one or more member selected from the group consisting of the polyamide, the polyphenylene ether, and the block copolymer consisting of at least one polymer block composed mainly of an aromatic vinyl compound and at least one polymer block composed mainly of a conjugated diene compound, with the oil. Among these, a particularly preferred method is mixing in advance the block copolymer with the oil. By mixing the block copolymer with the oil in advance, it becomes possible to increase the effect of suppressing wrinkle-like irregularities, deformation of molded products during heating, and the like. The addition amount of the oil is preferably less than 70 parts by mass, and more preferably less than 60 parts by mass, per 100 parts by mass of the block copolymer.

(Transition Metals and Halogens)

The thermoplastic resin composition according to the present embodiment may further comprise a transition metal and/or a halogen to provide even higher stability of heat resistance by the addition of the polyamide.

Preferred transition metals are copper, cerium, nickel, and cobalt; among these, particularly preferred is copper.

Preferred halogens are bromine and iodine.

The above-described transition metals and/or halogens may be used alone or in combination of two or more.

In the thermoplastic resin composition according to the present embodiment, the content of the transition metal is preferably 10 mass ppm or more and less than 200 mass ppm, and more preferably 10 mass ppm or more and less than 100 mass ppm.

In the thermoplastic resin composition according to the present embodiment, the content of the halogen is preferably 500 mass ppm or more and less than 1,500 mass ppm, and more preferably 700 mass ppm or more and less than 1,200 mass ppm.

For example, methods of adding the transition metal and/or halogen include: adding the transition metal and/or halogen in powder form at the time of melting and kneading of the thermoplastic resin composition according to the present embodiment; adding the transition metal and/or halogen at the time of polymerization of the polyamide; and adding the transition metal and/or halogen to the polyamide at a high concentration to prepare master pellets and adding the master pellets to the thermoplastic resin composition. Among these, preferred is adding the transition metal and/or halogen at the time of polymerization of the polyamide.

(Organic Stabilizer)

The thermoplastic resin composition according to the present embodiment may further comprise an organic stabilizer.

Examples of the organic stabilizer include: hindered phenol-based antioxidants such as Irganox 1098 (manufactured by Ciba Specialty Chemicals); phosphorus-based processing heat stabilizers such as Irgafos 168 (manufactured by Ciba Specialty Chemicals Inc.); lactone-based processing heat stabilizers such as HP-136 (manufactured by Ciba Specialty Chemicals Inc.); sulfur-based heat resistance stabilizers; and hindered amine-based light stabilizers. Among these, preferred are hindered phenol-based antioxidants, phosphorus-based processing heat stabilizers, or a mixture thereof.

In the thermoplastic resin composition according to the present embodiment, the content of the organic stabilizer is preferably 0.001 to 1 part by mass based on the polyamide (100 parts by mass).

The above-described organic stabilizers may be used alone or in a combination of two or more.

(Styrene-Based Thermoplastic Resin)

The thermoplastic resin composition according to the present embodiment may further comprise less than 50 parts by mass of a styrene-based thermoplastic resin per 100 parts by mass in total of the polyamide and the polyphenylene ether.

Examples of the styrene-based thermoplastic resin include homopolystyrene, rubber modified polystyrene (HIPS), styrene-acrylonitrile copolymer (AS resin), and styrene-rubbery polymer-acrylonitrile copolymer (ABS resin).

The above-described styrene-based thermoplastic resins may be used alone or in a combination of two or more.

(Stabilizer)

The thermoplastic resin composition according to the present embodiment may further comprise a stabilizer from the perspective of stabilizing the polyphenylene ether.

Examples of the stabilizer include metallic stabilizers such as zinc oxide and zinc sulfide; and organic stabilizers such as hindered phenol-based stabilizers, phosphorus-based stabilizers, and hindered amine-based stabilizers.

The content of the stabilizer is, for example, less than 5 parts by mass per 100 parts by mass of the polyphenylene ether.

The above-described stabilizers may be used alone or in a combination of two or more.

(Flame Retardant)

The thermoplastic resin composition according to the present embodiment may further comprise a flame retardant.

Examples of the flame retardant include: inorganic flame retardants such as magnesium hydroxide and aluminum hydroxide; nitrogen-containing cyclic compounds such as melamine, cyanuric acid, and salts thereof; organophosphate esters such as triphenyl phosphate, hydroxide triphenyl phosphate, bisphenol-A bis(diphenyl phosphate), and derivatives thereof; phosphoric acid-based nitrogen-containing compounds such as ammonium polyphosphate and melamine polyphosphate; phosphazene-based compounds described in JPH11181429A; boric acid compounds such as zinc borate; silicone oils; red phosphorus; phosphinates described in WO2007055147A; and mixtures thereof. Among these, preferred are nitrogen-containing cyclic compounds, organophosphate esters, phosphoric acid-based nitrogen-containing compounds, phosphazene-based compounds, boric acid compounds, silicone oils, and phosphinates, and more preferred are bisphenol-A bis(diphenyl phosphate) and derivatives thereof, phosphinates, and mixtures thereof.

The above-described phosphinates include at least one selected from the group consisting of phosphinates represented by formula (3) below, diphosphinates represented by formula (4) below, and condensates thereof.

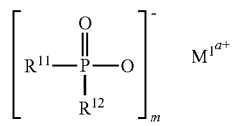

(3)

Where $R^{11}$ and $R^{12}$ each independently represent a linear or branched $C_1$-$C_6$ alkyl, aryl, or phenyl group; $M^1$ is at least one selected from the group consisting of calcium ion, magnesium ion, aluminum ion, zinc ion, bismuth ion, manganese ion, sodium ion, potassium ion, and protonated nitrogen base; a is an integer of 1 to 3; m is an integer of 1 to 3; and a=m.

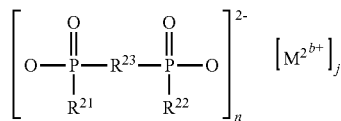

(4)

Where $R^{21}$ and $R^{22}$ each independently represent a linear or branched $C_1$-$C_6$ alkyl, aryl, or phenyl group; $R^{23}$ represents a linear or branched $C_1$-$C_{10}$ alkylene group, $C_6$-$C_{10}$ arylene group, $C_6$-$C_{10}$ alkyl arylene group, or $C_6$-$C_{10}$ arylalkylene group; $M^2$ represents at least one selected from the group consisting of calcium ion, magnesium ion, aluminum ion, zinc ion, bismuth ion, manganese ion, sodium ion, potassium ion, and protonated nitrogen base; b is an integer of 1 to 3; j is 1 or 2; n is an integer of 1 to 3; and b·j=2n.

The above-described flame retardant is preferably a substantially halogen-free, inorganic or organic flame retardant.

As used herein, "substantially halogen-free" refers to a halogen concentration of less than 2 mass % when the thermoplastic resin composition contains the flame retardant. When the thermoplastic resin composition contains the flame retardant, the halogen concentration is preferably less than 1 mass %, and more preferably less than 0.5 mass %.

In the thermoplastic resin composition according to the present embodiment, the content of the flame retardant is preferably 5 to 25 parts by mass per 100 parts by mass in total of the polyamide, the polyphenylene ether, and the impact modifier.

For example, methods of adding the flame retardant include adding the flame retardant to a resin forming a dispersed phase and to a resin forming a continuous phase in the thermoplastic resin composition. Specifically, an exemplary method includes adding, to a resin forming a dispersed phase and a resin forming a continuous phase, one or more flame retardants selected from the group consisting of phosphoric acid esters, nitrogen-containing cyclic compounds, phosphoric acid-based nitrogen-containing compounds, phosphazene-based compounds, boric acid compounds, silicone oils, and phosphinates.

Among these, a preferred method is adding different flame retardants to a dispersed phase and a continuous phase. Specifically, it is desirable to add, to a dispersed phase, one or more members selected from the group consisting of phosphoric acid esters, phosphoric acid-based nitrogen-containing compounds, phosphazene-based compounds, and silicone oils, and, to a continuous phase, one or more members selected from the group consisting of nitrogen-containing cyclic compounds, phosphoric acid-based nitrogen-containing compounds, boric acid compounds, and phosphinates.

(Anti-Dripping Agent)

The thermoplastic resin composition according to the present embodiment may further comprise an anti-dripping agent.

Examples of the anti-dripping agent include fluorine-based polymers such as tetrafluoroethylene. These anti-dripping agents may be used as a flame retardant as long as the halogen concentration in the thermoplastic resin composition is less than 2 mass %.

(Additional Components)

In addition to the above, the thermoplastic resin composition according to the present embodiment may further comprise an additional component without impairing the effect of the disclosure.

Examples of the additional component include: thermoplastic resins other than the above, such as polyester, polyolefin; inorganic fillers such as talc, kaolin, xonotlite, wollastonite, titanium oxide, potassium titanate, carbon fibers, and glass fibers; well-known silane coupling agents for increasing the affinity between inorganic fillers and resins; plasticizers such as low-molecular-weight polyolefin, polyethylene glycol, and fatty acid esters; coloring agents such as carbon black; conductive agents such as carbon fibers, conductive carbon black, and carbon fibrils; antistatic agents; peroxides; antioxidants; ultraviolet absorbers; and light stabilizers.

In the thermoplastic resin composition according to the present embodiment (100 parts by mass), the content of the additional component is preferably 50 parts by mass or less, more preferably less than 20 parts by mass, and even more preferably 10 parts by mass or less.

(Method of Producing the Thermoplastic Resin Composition)

Without limitation, a method of producing the thermoplastic resin composition according to the present embodiment includes adding and kneading (A) a polyamide, (B) a polyphenylene ether, and (C) a compatibilizer, and optionally one or more of the above-described impact modifier, oil, transition metal and/or halogen, organic stabilizer, styrene-based thermoplastic resin, stabilizer, flame retardant, anti-dripping agent, additional component, and the like.

The thermoplastic resin composition according to the present embodiment is produced with processing machines, such as, for example, a single screw extruder, a twin screw extruder, a roll mill, a kneader, a Brabender plastograph, and a Banbury mixer. Among these, preferred is a twin screw extruder, which is most preferably provided with, in particular, an upstream feed port and at least one downstream feed ports.

When producing the thermoplastic resin composition according to the present embodiment, melting and kneading temperatures are not particularly limited, yet may be normally selected from 240° C. to 360° C., taking into account the kneading conditions and the like.

The thermoplastic resin composition according to the present embodiment may be in the form of pellets cut from strands after extrusion.

(Physical Properties of the Thermoplastic Resin Composition)

The moisture percentage of the thermoplastic resin composition according to the present embodiment is preferably 150 mass ppm to 500 mass ppm. When the moisture percentage is within this range, the polyphenylene ether is subjected to a proper orientation during injection molding, and the mean ellipticity and the area fraction of the polyphenylene ether in a surface layer and an internal portion of the molded product are within the above-described ranges. Consequently, the molded product may have particularly superior appearance and hinge characteristics.

As used herein, "moisture percentage" refers to a moisture percentage of the thermoplastic resin composition in the form of pellets that can be measured in conformance with ISO 15512 (method B), using a moisture percentage measuring system having a water vaporizer and a Karl Fischer coulometric titrator, with oven temperature set at 185° C.

The moisture percentage can be adjusted to be 500 mass ppm or less by, for example, putting pellets into an aluminum-coated moisture barrier bag as soon as they are formed by extrusion. Upon a moisture absorption beyond 500 mass ppm, the moisture percentage may be adjusted by re-drying using a vacuum dryer, a dehumidifying dryer, a hot-air dryer, or the like.

Figure 1B:
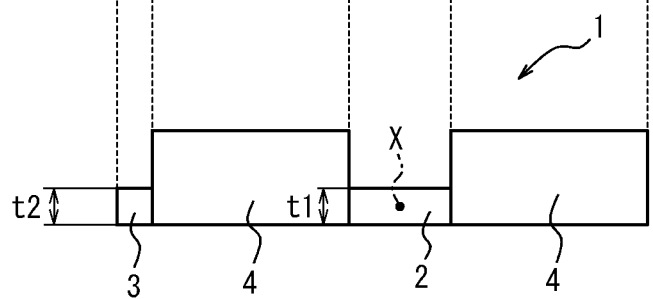
FIG. 1B is a side view of the specimen for evaluating hinge characteristics shown in FIG. 1A.

As illustrated in FIG. 1, for example, when the thermoplastic resin composition according to the present embodiment is charged from gate 3 and molded into specimen 1 comprising two structural parts 4 and hinge portion 2 having width w of 3 mm to 5 mm, length l of 5 mm to 25 mm, and thickness t1 of 0.3 mm to 0.7 mm for connecting the structural parts, a continuous phase containing the polyamide (A) and a dispersed phase containing the polyphenylene ether (B) are formed. The continuous phase is preferably formed only from the polyamide (A).

When the polyamide is contained in the continuous phase and the polyphenylene ether is in the dispersed phase, it is possible to provide a molded product having good hinge characteristics. Moreover, the thermoplastic resin composition that can form a molded product with the polyamide contained in the continuous phase and the polyphenylene ether in the dispersed phase also provides good fluidity.

With the thermoplastic resin composition according to the present embodiment, it becomes possible to provide a molded product in which a continuous phase containing the polyamide and a dispersed phase containing the polyphenylene ether are formed irrespective of the size of the molded product, because of the difference in melt viscosity between the polyamide and the polyphenylene ether.

In specimen 1 having two structural parts 4 and hinge portion 2 for connecting the structural parts, the structural parts 4 are preferably bent along a direction coinciding with the length direction of the hinge portion 2. In this case, the width w of the hinge portion is preferably equal to the distance between the two structural parts 4. In addition, the width of the hinge portion, the length direction of the hinge portion, and the thickness direction of the hinge portion are perpendicular to one another, and the length of the hinge portion is preferably larger than the thickness of the hinge portion.

As illustrated in FIG. 1, for example, when the thermoplastic resin composition according to the present embodiment is charged from gate 3 and molded into specimen 1 comprising two structural parts 4 and hinge portion 2 having width w of 3 mm to 5 mm, length l of 5 mm to 25 mm, and thickness t1 of 0.3 mm to 0.7 mm for connecting the structural parts, and provided that in a cross section of the specimen in a plane along the width and thickness directions passing through a midpoint in the length direction of the hinge portion, E-20 represents a mean ellipticity of the dispersed phase in region I extending from a surface of the hinge portion to a depth of 20 μm in the thickness direction, and E-mid represents a mean ellipticity of the dispersed phase in region II extending from a distance equal to 48% of the thickness t1 to a distance equal to 52% of the thickness t1, as measured along the thickness direction from the surface, the following formula (1) is satisfied:

$$4.0 \leq (E\text{-}20)/(E\text{-mid}) \tag{1}$$

(E-20)/(E-mid) is preferably 4.5 or more, and preferably 7.0 or less. The region I and the region II are preferably located in the hinge portion. When the mean ellipticity is within the above ranges, the hinge portion becomes resistant to repeated opening and closing, making it possible to provide a molded product having particularly good hinge characteristics. The mean ellipticity may be adjusted by controlling the injection molding conditions, such as resin temperature, mold temperature, injection rate, number of gates, gate shape, molded product thickness, moisture percentage, gate thickness, and the like.

As used herein, "mean ellipticity" is determined by observing region I and region II of each of three specimens under a transmission electron microscope at 5000 times magnification, measuring the major axis and the minor axis of each of 50 dispersed phases in region I or region II of each specimen using an image analysis device (trade name: "A-ZO Kun," manufactured by Asahi Kasei Engineering Corporation), calculating an ellipticity (=major axis/minor axis), and averaging the results from observing the ellipticity in region I (an average of ellipticity measurements of a total of 150 dispersed phases) and in region II (an average of ellipticity measurements of a total of 150 dispersed phases). In FIG. 1, the cross section in the plane along the width and thickness directions passing through the midpoint in the length direction of the hinge portion is a cross section along the width and thickness directions passing through the center of gravity X of the hinge portion, and may be parallel to the bending direction or perpendicular to the bend line.

In the thermoplastic resin composition according to the present embodiment, provided that S-20 represents an area fraction of the dispersed phase in region I, and S-mid represents an area fraction of the dispersed phase in region II, the following formula (2) is preferably satisfied:

$$1.10 \leq (S\text{-}20)/(S\text{-mid}) \quad (2)$$

(S-20)/(S-mid) is more preferably 1.15 or more, and preferably 1.60 or less. When the area fractions are within these ranges, the hinge portion becomes more resistant to repeated opening and closing, making it possible to provide a molded product having even better hinge characteristics.

The area fractions may be adjusted by controlling the injection molding conditions, such as the resin temperature, mold temperature, injection rate, number of gates, gate shape, molded product thickness, moisture percentage, gate thickness, and the like.

As used herein, an "area fraction" refers to the total area of a dispersed phase in a 20 μm square block arbitrarily selected from region I or region II of each of the three specimens. The area of a dispersed phase can be measured by observing the dispersed phase under a transmission electron microscope at 5000 times magnification using an image analysis device (trade name: "A-ZO kun," manufactured by Asahi Kasei Engineering Corporation).

From the perspective of providing even better heat resistance, the thermoplastic resin composition according to the present embodiment preferably has a deflection temperature under load in the range of 160° C. to 200° C. The deflection temperature under load can be measured according to the method explained in Examples below on the evaluation test, specifically in the section (1) Deflection temperature under load.

From the perspective of providing even better mechanical strength, the thermoplastic resin composition according to the present embodiment preferably has a Charpy impact strength in the range of 20 kJ/m$^2$ to 30 kJ/m$^2$. The Charpy impact strength can be measured according to the method explained in Examples below on the evaluation test, specifically in the section (2) Charpy Impact Strength.

From the perspective of providing even better mechanical strength, the thermoplastic resin composition according to the present embodiment preferably has a flexural modulus of 2200 MPa to 2800 MPa. The flexural modulus can be measured according to the methods explained in Examples below on the evaluation test, specifically in the section (3) Flexural modulus.

[Molded Product]

A molded product according to the disclosure is formed, at least in part, from the thermoplastic resin composition according to the present embodiment. The molded product according to the present embodiment may be formed entirely from the thermoplastic resin composition according to the present embodiment.

Examples of the molded product according to the present embodiment include molded products with a hinge portion, specifically, a molded product, as illustrated in FIG. 1, comprising two structural parts and a hinge portion for connecting the parts, with one of the structural parts connected by the hinge portion being provided with gate 3.

As used herein, "hinge portion" refers to a portion of one component at which two structural parts of the component are connected to each other. The hinge portion may be in the form of, for example, a thin plate, a film, or a string.

The hinge portion is formed preferably from a resin composition containing the thermoplastic resin composition according to the present embodiment, and more preferably from the thermoplastic resin composition according to the present embodiment.

The thickness of the hinge portion is preferably 0.1 mm to 3.0 mm, more preferably 0.3 mm to 1.2 mm, even more preferably 0.3 mm to 0.9 mm, and particularly preferably 0.3 mm to 0.7 mm. When the thickness of the molded product is within this range, the molded product has particularly good hinge characteristics and mechanical strength.

The width of the hinge portion is preferably 3 mm to 5 mm, and more preferably 3 mm. The length of the hinge portion is preferably 5 mm to 25 mm.

In the molded product according to the present embodiment, it is preferable for the hinge portion to satisfy formula (1) above, and more preferably satisfy both formula (1) and formula (2) above.

No particular limit is placed on the number of gates in the molded product according to the present embodiment. It is preferable for a gate to be provided at a position in a cross section parallel to the bending direction in a plane where the structural parts and the hinge portion are connected, preferably on an extension of the width direction of the hinge portion, from the perspective of causing a dispersed phase to face in the bending direction and to easily take an elliptical shape, thereby imparting excellent hinge characteristics to the hinge portion. For example, a gate is preferably provided at a position at which the gate is parallel to the bending direction of the hinge portion (the position of gate 3 in FIG. 1). The gate thus provided preferably extends along the width direction of the hinge portion.

The gate thickness is preferably 1.5 mm or less, more preferably 1.2 mm or less, even more preferably 1.0 mm or less, and particularly preferably 0.9 mm or less. The gate thickness is preferably 0.3 mm or more. When the gate thickness is 1.0 mm or less, it is possible to provide a molded product having still better appearance and hinge characteristics, even if the thermoplastic resin composition has low fluidity. In addition, when the gate thickness is 1.0 mm or less and when the entrance from which a hot-melt resin flows into the mold becomes thinner, the resin becomes more susceptible to strains upon injection. Consequently, the dispersed phase containing the polyphenylene ether varies in shape from round to elliptic, the distribution of polyphenylene ether tends to become skewed, and the resulting molded product takes a dispersed state more easily. When the gate thickness is larger than 1.5 mm, sufficient strains do not occur during molding, degrading the hinge characteristics.

As used herein, "gate thickness" refers to a thickness of the thinnest part of a portion corresponding to the gate of the mold.

Note that the gate of the molded product according to the present embodiment may be removed after molding.

In the molded product according to the present embodiment, the structural parts to be connected by the hinge portion are not particularly limited, and may be formed from a variety of materials, including the thermoplastic resin composition according to the present embodiment, a thermoplastic resin composition other than the disclosed one, a thermosetting resin, paper, fabric, metal, wood, ceramics, and the like. Among these, the thermoplastic resin composition according to the present embodiment is preferred from the perspective of increasing adhesiveness to the hinge portion.

In addition, the structural parts may be of any size without impairing the effect of the disclosure.

The molded product according to the present embodiment may be a molded product that is formed only from the thermoplastic resin composition according to the present embodiment, or a molded product that is formed from a composite material of the thermoplastic resin composition according to the present embodiment and any of thermoplastic resins or a composition thereof, a thermosetting resin, paper, fabric, metal, wood, ceramics, or the like.

The molded product according to the present embodiment has well-balanced advantageous characteristics inherent in polyamide and in polyphenylene ether-based resin, and exhibits good hinge characteristics and appearance. Making use of these characteristics, the molded product can be used effectively as automotive parts, engineering materials, industrial materials, electrical and electric parts, mechanical parts, office equipment parts, household articles, sheets, films, fibers, and other molded products of any shape and for any usage. The molded product is particularly preferably used as electrical and electric parts and those for automobiles, among others, as a relay block (relay box), which is one of electrical and electric parts for automobiles.

[Method of Producing a Molded Product]

A method of producing a molded product according to the disclosure includes molding the thermoplastic resin composition with a mold having a gate with a gate thickness of 1.0 mm or less, at a molding temperature of 270° C. to 290° C., a mold temperature of 30° C. to 60° C., and an injection rate of 45 cm³/sec or higher.

The molded product according to the present embodiment is preferably produced with the method of producing a molded product according to the disclosure.

The molded product according to the present embodiment may be produced using any of commonly-used molding processes and molding devices depending on the type, use, shape, and the like of the target molded product. A preferred molding process is injection molding.

The molded product according to the present embodiment is preferably produced at a molding temperature of 270° C. to 290° C. from the perspective of causing the dispersed phase of polyphenylene ether to be subjected to a proper orientation more easily during molding. If the molding temperature is below 270° C., fluidity is low, making molding difficult. Above 290° C., it becomes difficult for the dispersed phase to be subjected to a proper orientation.

The molded product according to the present embodiment is preferably produced at mold temperature of 30° C. to 60° C., from the perspectives of achieving thin wall molding while facilitating a proper orientation of the dispersed phase, and further controlling the proportion of the polyphenylene ether in the surface within a proper range. If the mold temperature is below 30° C., thin wall molding becomes difficult, and the proportion of the polyphenylene ether in the region extending from the surface to a depth of 20 μm the thickness direction decreases. If the mold temperature is above 60° C., it becomes difficult for the polyphenylene ether phase to be subjected to a proper orientation.

The molded product according to the present embodiment is preferably produced at an injection rate of 45 cm³/sec or higher from the perspective of a proper orientation of the dispersed phase.

EXAMPLES

The following provides further details of the disclosure with reference to examples and comparative examples. However, the disclosure should not be limited by any of the following examples.

Firstly, materials of the thermoplastic resin composition used in the examples and comparative examples are described.

(A) Polyamide (PA)

poly(hexamethylene adipamide), PA66 (viscosity=120 mL/g; terminal amino group concentration=30 μmol/g; terminal carboxyl group concentration=110 μmol/g; polymerized in the presence of copper iodide and potassium iodide, and containing 100 mass ppm of copper element and 4000 mass ppm of iodine.)

(B) Polyphenylene Ether (PPE)

Poly(2,6-dimethyl-1,4-phenyleneether) (reduced viscosity=0.42 dL/g [as measured in a 0.5 g/dL chloroform solution, at 30° C., using an Ubbelohde-type viscometer])

(C) Compatibilizer

MAH (trade name: "Maleic Anhydride," manufactured by Mitsubishi Chemical Corporation)

(D) Impact Modifier

SEBS (a copolymer formed by blocks of polystyrene-hydrogenated polybutadiene-polystyrene; number-average molecular weight=170,000; number-average molecular weight per polystyrene block=29,800; total styrene contents=35 mass %, 1,2-vinyl bond content=38%, hydrogenation ratio of polybutadiene part=98% or more; and containing 35 mass % of paraffin oil)

(E) Additional Components

A peroxide (trade name: "Perhexa 25B-40," manufactured by NOF Corporation)

The following provides a description of the extrusion and kneading process.

Using a twin screw extruder having one port on the upstream side and another on the extruder central part (trade name: "ZSK-70," manufactured by Werner & Pfleiderer (Germany)), the cylinder temperature was set at 320 for a region ranging from one feed port on the upstream side (hereinafter, abbreviated as "main-F") to the other feed port on the extruder central part (hereinafter abbreviated as "side-F"), and at 270° C. for a region ranging from side-F to the die.

A homogeneous mixture of PPE, SEBS, MAH as a compatibilizer, and a peroxide was fed from main-F in the proportions presented in Tables 1 and 2 below, and PA was fed from side-F in the proportions in Tables 1 and 2. Then, the mixture was subjected to melting and kneading, then extruded, and immersed in a strand bath (5 m long) to a distance of about 2 m, and cooled. Then, strands were cut into pellets using a pelletizer. To prevent moisture absorption, the pellets were immediately put into an aluminum-coated moisture barrier bag.

At this time, the screw speed was set at 300 rev/min and the feed rate at 1.5 t/h. In addition, openings were respectively provided in a barrel directly upstream of a barrel at which side-F was located and in a barrel directly upstream of the die, and the residual volatile components and the residual oligomer were removed by vacuum suction. At this time, the degree of vacuum was set at −700 mmHg.

Tables 1 and 2 list the content of each component, with the total content of (A) polyamide and (B) polyphenylene ether being 100 parts by mass.

Evaluation tests were conducted in examples and comparative examples under the conditions below.

(1) Deflection Temperature Under Load

According to ASTM D648, deflection temperature under load was measured by the following method.

Using an injection molding machine (TOYO Plaster TI-50G2), pellets of the thermoplastic resin compositions obtained in the examples and comparative examples were molded into ASTM strip specimens of 12.7 mm wide×127 mm long×3.2 mm thick, under the conditions presented in Tables 1 and 2. For the molded specimens, deflection temperature under load (heat deflection temperature) was measured under the load of 1.82 MPa.

(2) Charpy Impact Strength

Using an injection molding machine (TOYO Plaster TI-50G2), pellets of the thermoplastic resin compositions obtained in the examples and comparative examples were molded by injection molding into specimens of 10 mm wide×80 mm long×4 mm thick with a notch depth of 2 mm for measuring Charpy impact strength, under the conditions presented in Tables 1 and 2. For these specimens, measurements were made of Charpy impact strength in conformance with ISO 179.

(3) Flexural Modulus

Using an injection molding machine (TOYO Plaster TI-50G2), pellets of the thermoplastic resin compositions obtained in the examples and comparative examples were molded by injection molding into specimens of 10 mm wide×80 mm long×4 mm thick for measuring flexural modulus, under the conditions presented in Tables 1 and 2. These specimens were left to stand in an environment at 80° C. for 24 hours using a Geer oven, and then subjected to thermal hysteresis measurements. Measurement was made in conformity with ISO 178.

(4) Hinge Characteristics

Using an injection molding machine (TOYO Plaster TI-50G2), pellets of the thermoplastic resin compositions obtained in the examples and comparative examples were molded into specimens as illustrated in FIG. 1 for evaluating hinge characteristics, under the conditions presented in Tables 1 and 2. In conformity with JIS K7118-1995, each hinge portion was bent to almost 180° and bent back to the original position (0°), and this process was repeated at 33 times/min until fracture in a 50% RH atmosphere at 23° C. using an automatic repeating hinge testing machine (manufactured by Toyo Seiki Seisaku-Sho, Ltd.). Measurement was made of the number of bends until fracture occurred.

(5) Surface Appearance

Using an injection molding machine (TOYO Plaster TI-50G2), pellets of the thermoplastic resin compositions obtained in the examples and comparative examples were molded by injection molding into color chip molded pieces, and were visually classified into three grades. It is believed that foreign substances entrapped during molding were carbides of resins, moisture, or the like.

Good: no black spots or silver streaks were visually detectable

Fair: three or less black spots were visually detectable, without silver streaks or voids Poor: silver streaks, voids, and the like were visually detectable (6) Mean Ellipticity Three specimens for evaluating hinge characteristics were formed by molding. For each specimen, in a cross section of the specimen in a plane along the width and thickness directions passing through a midpoint in the length direction of the hinge portion, observation was made of region I extending from a surface of the hinge portion to a depth of 20 μm in the thickness direction and region II extending from a distance, measured along the thickness direction from the surface, equal to 48% of the thickness to a distance, measured along the thickness direction from the surface, equal to 52% of the thickness, using TEM (trade name: "Transmission Electron Microscope HT7700," manufactured by Hitachi High-Technologies Corporation) at 5000 times magnification. Then using an image analysis device (trade name: "Automatic Image Analyzer LUZEX SE," manufactured by Nireco Corporation), for each specimen the major and minor axes of 50 dispersed phases were measured in region I and region II to calculate an ellipticity (=major axis/minor axis), and an average of E-20 values for region I of the three specimens (an average of ellipticity measurements of 150 dispersed phases) and an average of E-mid values for region II of the specimens (an average of ellipticity measurements of 150 dispersed phases) were calculated to determine "E-20/E-mid."

The dispersed phases in region I and region II were sampled from the hinge portions. For a hinge portion having a thickness of 0.6 mm, region I represents a region extending from the surface to a depth of 20 μm in the thickness direction, and region II represents a region extending from a distance equal to 288 μm to a distance equal to 312 μm, as measured along the thickness direction from the surface.

(7) Area Fraction

Three specimens for evaluating hinge characteristics were formed by molding. For each specimen, in a cross section of the specimen in a plane along the width and thickness directions passing through a midpoint in the length direction of the hinge portion, observation was made of region I extending from the surface to a depth of 20 μm in the thickness direction and region II extending from a distance, measured along the thickness direction from the surface, equal to 48% of the thickness to a distance, measured along the thickness direction from the surface, equal to 52% of the thickness, using TEM (trade name: "Transmission Electron Microscope HT7700," manufactured by Hitachi High-Technologies Corporation) at 5000 times magnification. Then using an image analysis device (trade name: "Automatic Image Analyzer LUZEX SE," manufactured by Nireco Corporation), the total area (area fraction) of dispersed phases in the 20 μm square blocks arbitrarily sampled from among the region I and region II was measured. Then, an average of S-20 values for the area fraction of region I of the three specimens and an average of S-mid values for the area fraction of region II of the specimens were calculated to determine "S-20/S-mid."

The dispersed phases in region I and region II were sampled from the hinge portions.

(8) Moisture Percentage

In conformity with Method B of ISO 15512:1999 (oven set-point temperature: 185° C.), measurement was made of the moisture percentage of pellets of the thermoplastic resin compositions obtained in the examples and comparative examples.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Thermoplastic resin composition | (A) polyamide | PA66 | mass pts. | 68 | 68 | 68 | 68 | 68 | 68 | 68 | 56 | 68 |
| | (B) Polyphenylene ether | poly(2,6-dimethyl-1,4-phenyleneether) | mass pts. | 32 | 32 | 32 | 32 | 32 | 32 | 32 | 44 | 32 |
| | (C) Compatibilizer | MAH | mass pts. | 0.05 | 0.05 | 0.05 | 0.05 | 0.05 | 0.05 | 0.05 | 0.07 | 0.05 |

TABLE 1-continued

|  |  |  |  | Example 1 | Example 2 | Example 3 | Example 4 | Example 5 | Example 6 | Example 7 | Example 8 | Example 9 |
|---|---|---|---|---|---|---|---|---|---|---|---|---|
|  |  | (D) Impact modifier | SEBS | mass pts. | 5 | 5 | 5 | 5 | 5 | 5 | 5 | 11 | 5 |
|  |  | (E) Additional Component | peroxide | mass pts. | 0.08 | 0.08 | 0.08 | 0.08 | 0.08 | 0.08 | 0.08 | 0.07 | 0.08 |
| Molded product production | Moding conditions | molding temp. | ° C. | 290 | 270 | 290 | 290 | 290 | 290 | 290 | 290 | 290 |
|  |  | mold temp. | ° C. | 50 | 50 | 50 | 50 | 50 | 50 | 50 | 50 | 50 |
|  |  | injection rate | cm³/sec | 50 | 50 | 67 | 101 | 50 | 50 | 50 | 50 | 50 |
|  | Mold size | hinge portion thickness | mm | 0.6 | 0.6 | 0.6 | 0.6 | 0.4 | 0.6 | 0.6 | 0.6 | 0.7 |
|  |  | hinge portion width | mm | 3 | 3 | 3 | 3 | 3 | 3 | 3 | 3 | 5 |
|  |  | hinge portion length | mm | 22 | 22 | 22 | 22 | 22 | 10 | 22 | 22 | 22 |
|  |  | gate thickness | mm | 0.8 | 0.8 | 0.8 | 0.8 | 0.8 | 0.8 | 0.4 | 0.8 | 0.8 |
| Evaluation | (1) Deflection temperature under load |  | ° C. | 175 | 175 | 175 | 175 | 175 | 175 | 175 | 180 | 175 |
|  | (2) Charpy impact strength |  | kJ/m² | 22 | 22 | 22 | 22 | 22 | 22 | 22 | 29 | 21 |
|  | (3) Flexural modulus |  | MPa | 2570 | 2570 | 2570 | 2570 | 2570 | 2570 | 2570 | 2350 | 2350 |
|  | (4) Hinge characteristics |  | Number of bends | 1236 | 1457 | 1237 | 1230 | 1500 | 1500 | 1500 | 1200 | 1200 |
|  | (5) Surface appearance |  | — | Good | Good | Good | Good | Good | Good | Good | Good | Good |
|  | (6) Mean ellipticity ((E-20)/(E-mid)) |  | — | 4.9 | 6.5 | 5.7 | 6.3 | 6.6 | 5.0 | 6.0 | 5.0 | 4.4 |
|  | (7) Area fraction ((S-20)/(S-mid)) |  | — | 1.12 | 1.50 | 1.10 | 1.27 | 1.42 | 1.12 | 1.10 | 1.20 | 1.05 |
|  | (8) Moisture percentage |  | mass ppm | 400 | 400 | 400 | 400 | 400 | 400 | 400 | 300 | 400 |

TABLE 2

|  |  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Thermoplastic resin composition | (A) polyamide | PA66 | mass pts. | 65 | 65 | 65 | 65 | 65 | 65 | 20 |
|  | (B) Polyphenylene ether | poly(2,6-dimethyl-1,4-phenyleneether) | mass pts. | 30 | 30 | 30 | 30 | 30 | 30 | 75 |
|  | (C) Compatibilizer | MAH | mass pts. | 0.05 | 0.05 | 0.05 | 0.05 | 0.05 | 0.05 | 0.05 |
|  | (D) Impact modifier | SEBS | mass pts. | 5 | 5 | 5 | 5 | 5 | 5 | 5 |
|  | (E) Additional Component | peroxide | mass pts. | 0.08 | 0.08 | 0.08 | 0.08 | 0.08 | 0.08 | 0.08 |
| Molded product production | Moding conditions | molding temp. | ° C. | 295 | 290 | 290 | 290 | 290 | 290 | 290 |
|  |  | mold temp. | ° C. | 50 | 50 | 50 | 50 | 50 | 50 | 50 |
|  |  | injection rate | cm³/sec | 50 | 22 | 67 | 101 | 50 | 50 | 50 |
|  | Mold size | hinge portion thickness | mm | 0.6 | 0.6 | 0.8 | 0.6 | 0.4 | 0.6 | 0.6 |
|  |  | hinge portion width | mm | 3 | 3 | 3 | 3 | 3 | 3 | 3 |
|  |  | hinge portion length | mm | 22 | 22 | 22 | 30 | 22 | 10 | 10 |
|  |  | gate thickness | mm | 0.8 | 0.8 | 0.8 | 0.8 | 1.6 | 0.8 | 0.8 |
| Evaluation | (1) Deflection temperature under load |  | ° C. | 175 | 175 | 175 | 175 | 175 | 175 | 95 |
|  | (2) Charpy impact strength |  | kJ/m² | 22 | 22 | 22 | 22 | 22 | 22 | 5 |
|  | (3) Flexural modulus |  | MPa | 2570 | 2570 | 2570 | 2570 | 2570 | 2570 | 1200 |
|  | (4) Hinge characteristics |  | Number of bends | 953 | 900 | 900 | 950 | 500 | 950 | 150 |
|  | (5) Surface appearance |  | — | Good | Good | Good | Good | Good | Poor | Good |
|  | (6) Mean ellipticity ((E-20)/(E-mid)) |  | — | 3.0 | 2.95 | 3.0 | 3.0 | 3.0 | 3.5 | — |
|  | (7) Area fraction ((S-20)/(S-mid)) |  | — | 1.08 | 1.10 | 1.10 | 1.12 | 1.05 | 1.08 | 1.05 |
|  | (8) Moisture percentage |  | mass ppm | 400 | 400 | 400 | 400 | 400 | 1350 | 200 |

Comparison between the examples and the comparative examples showed that if the value of (E-20)/(E-mid) is 4.0 or more, good hinge characteristics are maintained. It was also identified that if the value of (E-20)/(E-mid) is 4.0 or more and the value of (S-20)/(S-mid) is 1 or more, even better hinge characteristics are obtained. Moreover, Comparative Example 6 proved that if the moisture percentage of pellets of the thermoplastic resin composition is high, the molded product tends to have poor surface appearance. For Comparative Example 7 to which PPE was added in an amount of 75 parts by mass, (E-20)/(E-mid) could not be measured due to a layering of PPE.

REFERENCE SIGNS LIST

1 Specimen
2 Hinge portion
3 Gate
4 Structural part
l Hinge portion length
w Hinge portion width
X Center of gravity of the hinge portion
t1 Hinge portion thickness
t2 Gate thickness

The invention claimed is:
1. A molded product comprising:
a specimen, the specimen having two structural parts and a hinge portion;
the hinge portion having a width of 3 mm to 5 mm, a length of 5 mm to 25 mm, and a thickness of 0.3 mm to 0.7 mm for connecting the two structural parts, wherein
the hinge portion is comprised of a thermoplastic resin composition, the thermoplastic resin composition comprising (A) a polyamide, (B) a polyphenylene ether, and (C) a compatibilizer;

the specimen having a continuous phase wherein the continuous phase is comprised of the polyamide (A), the specimen also having a dispersed phase wherein the dispersed phase is comprised of the polyphenylene ether (B);

a region I extends for a first distance t1, the first distance t1 extending from a first surface of the hinge portion to a depth of 20 μm in the thickness direction of the hinge portion, and wherein region I comprises E-20, such that E-20 represents a mean ellipticity of the dispersed phase;

a region II extends for a second distance t2 such that the second distance t2 extends from a second surface of the hinge portion and the second distance t2 is between 48% and 52% of the first distance t1, and wherein region II comprises E-mid, such that E-mid represents a mean ellipticity of the dispersed phase; and the following formula (1) is satisfied:

$$4.0 \leq (E\text{-}20)/(E\text{-mid}) \quad (1).$$

2. The molded product according to claim 1, wherein region I further comprises S-20, such that S-20 represents an area fraction of the dispersed phase; and region II further comprises S-mid, such that S-mid represents an area fraction of the polyphenylene ether (B) in the dispersed phase; and the following formula (2) is satisfied:

$$1.10 \leq (S\text{-}20)/(S\text{-mid}) \quad (2).$$

3. The molded product according to claim 1, wherein the thermoplastic resin composition comprises 40 to 90 parts by mass of the polyamide (A) and 60 to 10 parts by mass of the polyphenylene ether (B), per 100 parts by mass in total of the polyamide (A) and the polyphenylene ether (B).

4. The molded product according to claim 1, wherein the compatibilizer (C) is at least one selected from the group consisting of maleic anhydride, maleic acid, citric acid, and fumaric acid, and the thermoplastic resin composition comprises 0.03 to 10.0 parts by mass of the compatibilizer (C) per 100 parts by mass in total of the polyamide (A) and the polyphenylene ether (B).

5. The molded product according to claim 1, further comprising (D) an impact modifier.

6. The molded product according to claim 1, wherein the the specimen is a part of an automotive part.

7. The molded product according to claim 6, wherein the the specimen is part of a relay block.

8. A method of producing the molded product as recited in claim 1 with a mold having a gate with a gate thickness of 1.0 mm or less, at a molding temperature of 270° C. to 290° C., a mold temperature of 30° C. to 60° C., and an injection rate of 45 cm$^3$/sec or higher.

9. The method of producing a molded product according to claim 8, wherein the thermoplastic resin composition is in the form of pellets with a moisture percentage of 150 mass ppm to 500 mass ppm.

* * * * *